United States Patent
Allegretti et al.

(10) Patent No.: US 8,220,801 B2
(45) Date of Patent: Jul. 17, 2012

(54) FRONT MECHANICAL SEAL FOR PUMPS

(75) Inventors: Didio Allegretti, Terni (IT); Daniele Ficorilli, Terni (IT)

(73) Assignee: Meccanotecnica Umbra S.p.A., Campello Sul Clitunno (PG) (IT)

( * ) Notice: Subject to any disclaimer, the term of this patent is extended or adjusted under 35 U.S.C. 154(b) by 84 days.

(21) Appl. No.: 12/735,053

(22) PCT Filed: Dec. 11, 2008

(86) PCT No.: PCT/EP2008/067327
§ 371 (c)(1),
(2), (4) Date: Jun. 11, 2010

(87) PCT Pub. No.: WO2009/074648
PCT Pub. Date: Jun. 18, 2009

(65) Prior Publication Data
US 2010/0259012 A1    Oct. 14, 2010

(30) Foreign Application Priority Data

Dec. 12, 2007   (IT) .............................. MC2007A0238

(51) Int. Cl.
*F16J 15/34* (2006.01)
(52) U.S. Cl. ......................................................... 277/373
(58) Field of Classification Search ................... 277/361, 277/363, 366, 373
See application file for complete search history.

(56) References Cited

U.S. PATENT DOCUMENTS

| | | | | | |
|---|---|---|---|---|---|
| 2,385,420 | A | * | 9/1945 | Meyer | 277/373 |
| 2,650,841 | A | * | 9/1953 | Meyer | 277/373 |
| 2,711,919 | A | * | 6/1955 | Moskovitz | 277/373 |
| 2,912,265 | A | * | 11/1959 | Brummer | 277/363 |
| 2,964,340 | A | * | 12/1960 | Kinzie et al. | 277/395 |
| 3,066,942 | A | * | 12/1962 | Schwing | 277/366 |
| 3,117,793 | A | * | 1/1964 | Hauser et al. | 277/372 |
| 3,198,530 | A | * | 8/1965 | Conklin | 277/395 |
| 3,250,539 | A | * | 5/1966 | Kurz et al. | 277/373 |
| 3,472,522 | A | * | 10/1969 | Winfrey | 277/352 |
| 3,672,689 | A | * | 6/1972 | Hadley | 277/373 |
| 3,972,536 | A | | 8/1976 | Warner et al. | |
| 4,103,906 | A | * | 8/1978 | Gits | 277/391 |
| 4,213,618 | A | * | 7/1980 | Thurber | 277/373 |
| 4,586,719 | A | * | 5/1986 | Marsi et al. | 277/385 |
| 5,769,605 | A | * | 6/1998 | Kung | 415/230 |
| 6,460,858 | B1 | * | 10/2002 | Kitajima et al. | 277/370 |
| 6,568,686 | B2 | * | 5/2003 | Hadley | 277/370 |
| 6,688,601 | B2 | * | 2/2004 | Takahashi | 277/358 |
| 6,935,633 | B2 | * | 8/2005 | Huang | 277/372 |
| 7,204,490 | B2 | * | 4/2007 | Huang | 277/372 |
| 7,699,579 | B2 | * | 4/2010 | Yandle, II | 415/1 |
| 7,726,658 | B2 | * | 6/2010 | Grunwald et al. | 277/366 |

OTHER PUBLICATIONS

International Search Report for PCT/EP2008/067327 mailed May 27, 2009.

* cited by examiner

*Primary Examiner* — Vishal Patel
(74) *Attorney, Agent, or Firm* — Lowe Hauptman Ham & Berner, LLP

(57) ABSTRACT

A front mechanical seal for pumps with frictional rings and fluid lubrication includes a rotary seal mounted on a support collar, which is formed of a first collar, and a second collar prismatically coupled by means of one or more tongues which are formed on the second collar and contained in corresponding housings on the first collar.

8 Claims, 3 Drawing Sheets

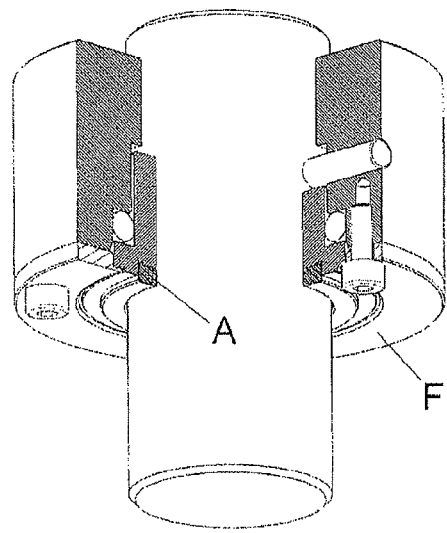
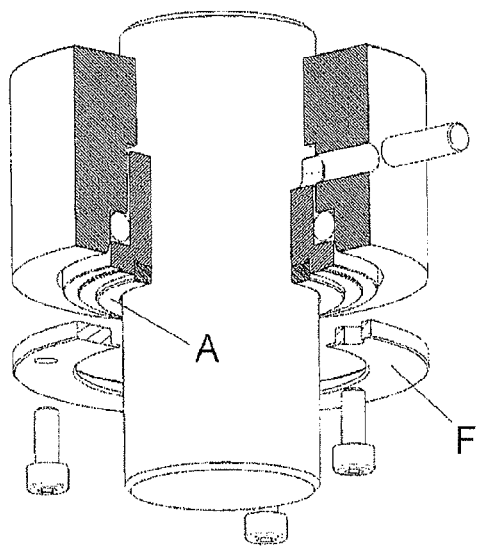
FIG. 6                FIG. 5
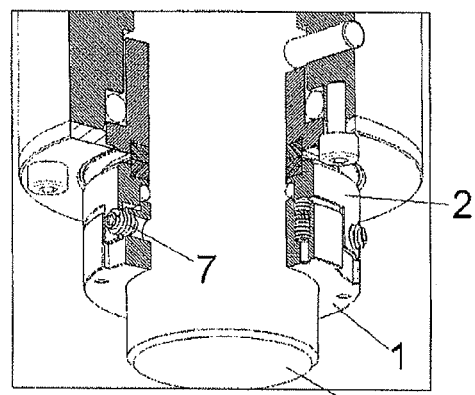
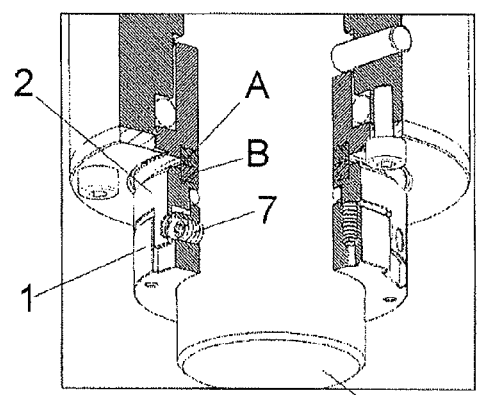
FIG. 7                FIG. 8

FRONT MECHANICAL SEAL FOR PUMPS

CROSS-REFERENCE TO RELATED APPLICATIONS

The present Application is based on International Application No. PCT/EP2008/067327, filed on Dec. 11, 2008, which in turn corresponds to Italy Application No. MC2007A000238, filed on Dec. 12, 2007, and priority is hereby claimed under 35 U.S.C. §119 based on these applications. Each of these applications are hereby incorporated by reference in their entirety into the present application.

TECHNICAL FIELD

Background

The present patent application for invention relates to a front mechanical seal for pumps, with frictional rings and fluid lubrication, of improved type.

To better understand the problem and the advantages offered by the present invention, reference must be made to the structural configuration of the traditional front mechanical seals with frictional rings that are currently available on the market.

First of all, it must be noted that a front mechanical seal comprises a parallel pair of flat rings, of which one is fixed (the so-called "stationary seal") and mounted in a suitable housing obtained in the pump-body, and one rotates with the shaft (the so-called "rotary seal"), being mounted on a support collar that is inserted and joined to the pump shaft.

More precisely, the support collar of the rotary ring is formed of a parallel concentric pair of collars:

a first collar (also defined as "seal body") designed to be inserted and joined with the pump shaft;
 and a second collar, on which the "rotary seal" is physically mounted and perfectly centred with respect to the pump shaft.

In order to guarantee a constant pressing pressure between the "rotary seal" and the "stationary seal", regardless of the inevitable wear of the front sliding tracks, the second collar is free to slide in axial direction with respect to the first collar and is constantly subjected to the force of springs positioned between the first and second collar that constantly push the "rotary seal" against the "stationary seal".

In view of the above, the second collar must be coupled to the first collar in such a way to be driven into rotation by the first collar, while maintaining the possibility to slide in axial direction with respect to the first collar.

Today the said coupling is obtained by means of the same radial pins used to tighten the first collar or "seal body" to the pump shaft, while the second collar is provided with a back section (that is to say on the opposite side with respect to the "rotary seal") that is inserted and exactly centred externally on the said first collar.

The back section of the second collar is provided with sliding slots with longitudinal axis parallel to the rotation axis of the "rotary seal".

The said slots receive the radial pins that are used to tighten the first collar on the pump shaft.

The length of the said pins is such that, once tightening has been completed, part of their threaded stem remains inside the said slots to guarantee the transmission of the torque from the first to the second collar.

Evidently, with the gradual wear of the sliding tracks, the second collar slides in axial direction with respect to the first collar, with consequent automatic instantaneous recovery of the clearance between the "stationary seal" and the "rotary seal" due to the presence of the said sliding slots that allow the second collar to slide in axial direction with respect to the tightening pins screwed onto the first collar.

One of the main drawbacks of the front mechanical seals of known type illustrated above consists in the damage of the parts involved in the driving system of the second collar by the first collar, with consequent problems in terms of duration and reliability of the seal.

The said damage is caused by the fact that, during the pump operation, wear is generated by the energetic contact between the thread of the tightening pin and the longitudinal border of the corresponding slot, increasing every time the pump is started and stopped.

The said wear causes the malfunctioning of the seal, since the pin is engaged in a sort of cavity made by it on the border of the slot, thus losing the possibility to slide freely in axial direction that is necessary to guarantee the perfect adherence between the sliding tracks.

Moreover, it must be noted that the tightening pins must be periodically replaced during the initial wear, since their thread is rapidly and considerably damaged.

SUMMARY

The main purpose of the present invention is to remedy the aforementioned drawbacks, by designing a new front mechanical seal for pumps, with frictional rings and fluid lubrication, in which the tightening pins of the second collar are no longer responsible for driving the second collar into rotation.

Another purpose of the present invention is to design a front mechanical seal for pumps, with frictional rings and fluid lubrication, of improved type, which can be delivered to the client in pre-assembled condition at work height (i.e. with the "rotary seal" already engaged against the "stationary seal" with the predefined pressing pressure), thus avoiding the need for the operator to make difficult measurements during the installation on the pump.

The innovative characteristics of the front mechanical seal of the invention are claimed in the first claim and in the following dependent claims.

The front seal of the present invention comprises a "stationary seal" of traditional type and a support collar of the "rotary seal" of innovative type, regardless of being traditionally formed of a first collar designed to be inserted and joined by means of tightening pins to the pump shaft and of a second collar that directly supports the "rotary seal" and is free to slide in axial direction with respect to the first collar.

The innovative characteristic of the support collar of the "rotary seal" consists in the means for direct prismatic coupling between the first collar, also defined as "seal body" and the second collar.

The expression "prismatic coupling" refers to a coupling without the interposition of means other than the two parts to be coupled.

The said direct prismatic coupling means consist in at least one, preferably more than one, tongue parallel to the rotational axis of the "rotary seal" that protrudes from the back border of the second collar; the said tongue is engaged with possibility of sliding freely in axial direction inside a corresponding housing obtained on the external surface of the "seal body".

The tongue is provided with a central hole for the insertion of the tightening pin of the "seal body", which is in turn provided with a radial threaded hole.

The length of the tightening pin is such that, once tightening has been completed, the pin does not interfere with his insertion hole obtained on the said tongue, so that it is no longer able to obstruct the axial sliding of the second collar.

This means that the tightening pin is only designed to stop the "seal body" on the pump shaft, while the coupling between the said longitudinal tongues and the corresponding housings ensures the transmission of the movement of the "seal body" to the second collar, although the latter is free to slide in axial direction with respect to the first collar under the push of the springs positioned between the "seal body" and the second collar.

BRIEF DESCRIPTION OF DRAWINGS

For major clarity, the description of the front mechanical seal of the present invention continues with reference to the enclosed drawings, which are only for illustrative, not limitative purposes, whereby:

FIGS. 3 to 8 show the sequence of the assembly operations of the mechanical seal of the present invention;

DETAILED DESCRIPTION

Figure 1:
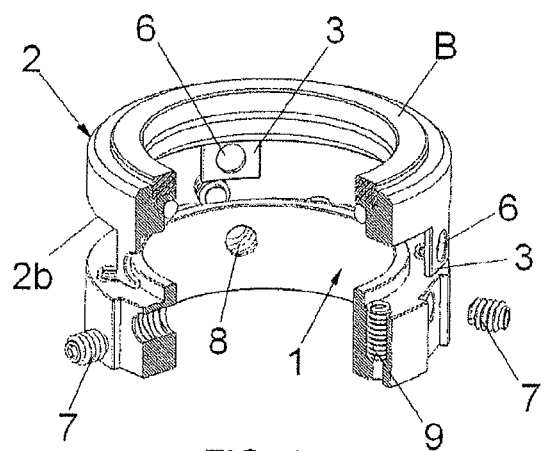
FIG. 1 is an axonometric exploded cross-section of the "seal body" and of the second collar.
Figure 2:
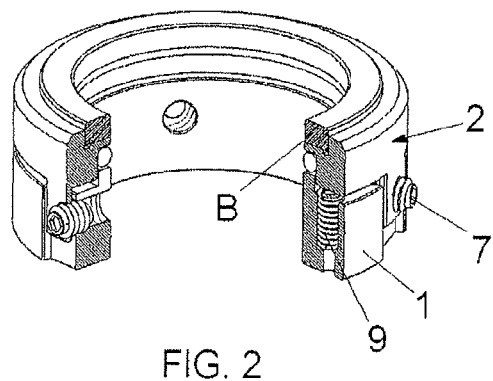
FIG. 2 is basically the same as FIG. 1, with the only difference that it shows the "seal body" and the second collar mutually joined.
Figure 3:
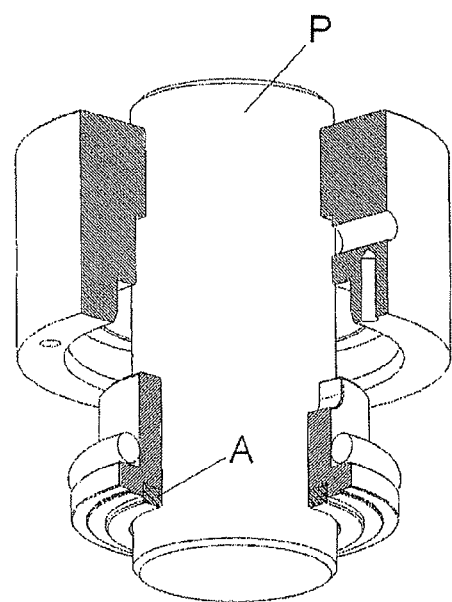
Figure 4:
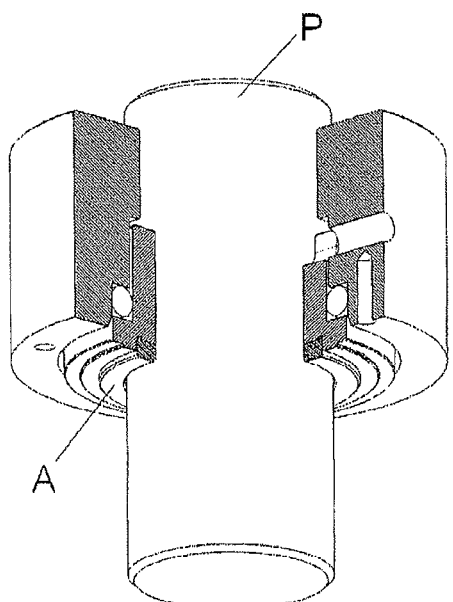

With reference to FIGS. 1, 2 and 3, the mechanical seal of the invention comprises a "stationary seal" (A) and a "rotary seal" (B).

The "rotary seal" (B) is mounted on a support collar formed of:
- a first collar or "seal body" (1) designed to be inserted and joined to the shaft (P) of the pump;
- and a second collar (2), on which the "rotary seal" (B) is physically mounted, being perfectly centred with respect to the shaft (P) of the pump.

Figure 9:
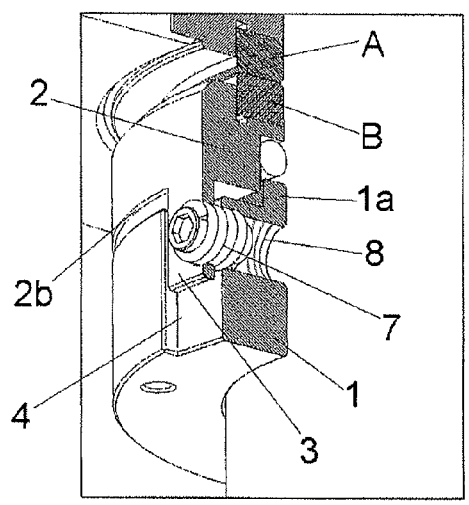
FIG. 9 is an enlarged view of FIG. 7.
Figure 10:
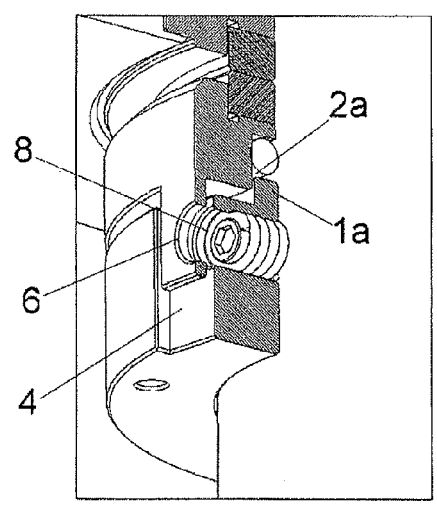
FIG. 10 is an enlarged view of FIG. 8.

As shown in FIGS. 9 and 10, the second collar (2) is parallel to the "seal body" (1), which is situated on the back of the second collar (2), which frontally supports the "rotary seal" (B).

At the same time, however, the collar (2) externally embraces the "seal body" (1), which is provided with a front support ring (1a) that acts as centring for the second collar (2), which is internally provided with an annular groove (2a) where the support ring (1a) is exactly inserted.

The innovative characteristic of the mechanical seal of the invention consists in the fact that the second collar (2) is provided on the back border (2b) with one or more—specifically three—tongues (3) that protrude in axial direction towards the back and are contained inside corresponding housings (4) obtained on the "seal body" (1).

Each tongue (3) is provided with a central hole (6) for the insertion of the tightening pin (7) of the "seal body" (1), which is in turn provided with a radial threaded hole (8).

As shown in FIG. 10, the length of the tightening pin (7) is such that, once tightening has been completed, the pin (7) does not interfere with the insertion hole (6), in such a way the second collar (2) can be pushed forward under the force of the springs (9) as soon as the interference between the said pin (7) and the insertion hole (6) ends.

In view of the above description, which is made with reference to the enclosed drawings, it appears evident that the front mechanical seal according to the present invention can be delivered to the client in pre-assembled condition at work height.

Reference is made to the assembly procedure of the front mechanical seal of the invention, illustrated in FIGS. 3 to 8.

The first operation to be performed is the insertion of the "stationary seal" (A) in the housing obtained on the pump body.

The locking of the "stationary seal" (A) is guaranteed by the front opposition of a back flange (F) and by the insertion of an anti-rotation plug into the corresponding slot.

Then the "rotary seal" (B) is splined on the shaft (P), being delivered with the second collar (2) locked on the "seal body" (1) by means of pins (7) that are partially engaged into the corresponding holes (8) in such a way to prevent the axial sliding of the second collar (2) with respect to the "seal body" (1).

In this way the springs (9) are already loaded and provide an axial thrust equal to the work thrust predefined during the design stage.

Now, once the surfaces of the sliding tracks are in mutual contrast, the operator simply needs to fix the "seal body" (1) to the shaft (P).

By exerting a small pressure towards the "stationary seal" (A) the operator tightens the pins (7) completely, making the said pins lose the interference with the hole (6), and releasing the second collar (2) that is pushed forward under the thrust of the springs (9).

Now the tightening pins (7) are no longer loaded with the load of the springs (9), which is now on the sliding tracks, thus guaranteeing the necessary pressure to establish an initial contact between the sliding tracks and maintain the said contact also when the seal is stopped in order to prevent leaks.

Evidently, the seal of the invention eliminates the risk that the tightening pins (7) may scratch and damage the second collar (2), as experienced in seals of known type.

In the seal of the invention, the transmission of the torque from the "seal body" (1) to the second collar (2) is no longer obtained by means of the tightening pins (7), but by means of the direct prismatic coupling between the said tongues (3) and the corresponding housings (4), with one longitudinal border (4a) of the housings (4) entering in contact with one of the longitudinal borders (3a) of the tongues (3).

The invention claimed is:

1. A front mechanical seal assembly for pumps, comprising:
   a first collar adapted to mount to a shaft of the pump and having an inner face adapted to face toward the shaft and an outer face adapted to face away from the shaft;
   a second collar engageable with the first collar; a rotary seal rotatable in an axial direction thereof and mounted to the second collar; and at least one spring between the first and second collars and biasing against the second collar in the axial direction,
   wherein the first collar includes a recess portion on the outer face, a threaded hole, and at least one tightening pin arranged in the threaded hole,
   wherein the second collar includes a tongue that protrudes toward the recess portion in the axial direction and has a central hole for receiving the tightening pin,
   wherein said tongue is engageable in said recess portion to define a prismatic coupling between the first collar and the second collar,
   wherein, upon inserting the tightening pin into the central hole, said at least one tightening pin locks the second collar to the shaft of the pump, and wherein, upon inserting the tightening pin into the threaded hole, said at least one tightening pin locks the first collar to the shaft of the pump and the tightening pin does not interfere with the central hole so that the second collar is axially movable with respect to the first collar, wherein the second collar externally embraces the first collar and further includes an annular groove at the inner surface and at near an end of the rotary seal, wherein the first collar further includes a support ring received in the annular groove of the second collar for centering the second collar with respect to the shaft of the pump, and wherein the second collar further comprises another tongue adjacent to said tongue in a circumferential direction of the second collar and protruding toward another recess portion of the first collar in the axial direction.

2. The front mechanical seal assembly according to claim 1, wherein said at least one tightening pin is a threaded pin which is screwable into the central hole of the tongue and the threaded hole of the first collar.

3. The front mechanical seal assembly according to claim 1, wherein the second collar is configured to be centered with respect to the shaft of the pump.

4. The front mechanical seal assembly according to claim 1, wherein a diameter of the central hole is substantially the same as that of the threaded hole of the first collar.

5. A pre-assembled front mechanical seal assembly, comprising:
a stationary seal;
a rotary seal engaged with the stationary seal and rotatable in an axial direction thereof;
a first collar adapted to mount to a shaft of the pump and having an inner face adapted to face toward the shaft and an outer face adapted to face away from the shaft;
a second collar engaged with the first collar and coupled with the rotary seal; and
at least one spring between the first and second collars and biasing against the second collar in the axial direction, wherein the first collar includes a recess portion on the outer face, a threaded hole, and at least one tightening pin arranged in the threaded hole, wherein the second collar includes a tongue that protrudes toward the recess portion in the axial direction and has a central hole for receiving the tightening pin, wherein said tongue is engaged in said recess portion to define a prismatic coupling between the first collar and the second collar, wherein the tightening pin is inserted into the central hole and said at least one tightening pin locks the second collar to the shaft of the pump, wherein the tightening pin is inserted into the threaded hole and said at least one tightening pin locks the first collar to the shaft of the pump and the tightening pin does not interfere with the central hole so that the second collar is axially movable with respect to the first collar, wherein the second collar externally embraces the first collar and further includes an annular groove at the inner surface and at near an end of the rotary seal, wherein the first collar further includes a support ring received in the annular groove of the second collar for centering the second collar with respect to the shaft of the pump, and wherein the second collar further comprises another tongue adjacent to said tongue in a circumferential direction of the second collar and protruding toward another recess portion of the first collar in the axial direction.

6. The front mechanical seal assembly according to claim 5, wherein said at least one tightening pin is a threaded pin which is screwable into the central hole of the tongue and the threaded hole of the first collar.

7. The front mechanical seal assembly according to claim 5, wherein the second collar is configured to be centered with respect to the shaft of the pump.

8. The front mechanical seal assembly according to claim 5, wherein a diameter of the central hole is substantially the same as that of the threaded hole of the first collar.

* * * * *